United States Patent
Birchbauer et al.

(10) Patent No.: US 11,022,426 B2
(45) Date of Patent: Jun. 1, 2021

(54) LAYER THICKNESS MEASUREMENT OF SOIL COVERING

(71) Applicant: Siemens Aktiengesellschaft, Munich (DE)

(72) Inventors: Josef Alois Birchbauer, Seiersberg (AT); Juergen Hatzl, Granfenschachen (AT); Michael Hödlmoser, Vienna (AT); Stefan Wakolbinger, Graz (AT); Claudia Windisch, St. Johann (AT); Michael Hornacek, Vienna (AT)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 250 days.

(21) Appl. No.: 16/091,380

(22) PCT Filed: Mar. 30, 2017

(86) PCT No.: PCT/EP2017/057499
§ 371 (c)(1),
(2) Date: Oct. 4, 2018

(87) PCT Pub. No.: WO2017/174426
PCT Pub. Date: Oct. 12, 2017

(65) Prior Publication Data
US 2019/0154434 A1    May 23, 2019

(30) Foreign Application Priority Data
Apr. 8, 2016  (EP) .................................. 16164385

(51) Int. Cl.
*G01B 11/06* (2006.01)
*B64C 39/02* (2006.01)
(Continued)

(52) U.S. Cl.
CPC ........ *G01B 11/0616* (2013.01); *B64C 39/024* (2013.01); *G01B 11/06* (2013.01);
(Continued)

(58) Field of Classification Search
CPC combination set(s) only.
See application file for complete search history.

(56) References Cited

U.S. PATENT DOCUMENTS

2018/0357777 A1* 12/2018 Birchbauer ............... G06T 7/74

FOREIGN PATENT DOCUMENTS

| EP | 1709396 | 10/2006 |
| EP | 2647951 | 10/2013 |

(Continued)

OTHER PUBLICATIONS

Moya el al, "Alternative Geohazard Risk Assessment and Monitoring for Pipelines with Limited Access: Amazon Jungle Example", 2014, Proceedings of the 2014 10th International Pipleline Conference in Calgary, Alberta, Canada, pp. 1-13. (Year: 2014).*

(Continued)

*Primary Examiner* — Hina F Ayub
*Assistant Examiner* — Amanda Merlino
(74) *Attorney, Agent, or Firm* — Cozen O'Connor

(57) ABSTRACT

A method for measure the layer thickness of soil coverings, in particular in the case of gas and oil pipelines laid underground, wherein the device to be covered is measured and the coordinates thereof in relation to a specified coordinate system are recorded, where the course of the terrain over the device is measured and a terrain model is determined therefrom and recorded in the specified coordinate system after the soil covering has been applied, and where the layer thickness of the soil covering is determined from the coordinates of the device and from the terrain model.

7 Claims, 2 Drawing Sheets

(51) Int. Cl.
*G01C 7/04* (2006.01)
*G01B 21/08* (2006.01)

(52) U.S. Cl.
CPC .............. *G01B 21/08* (2013.01); *G01C 7/04* (2013.01); *B64C 2201/123* (2013.01)

(56) References Cited

FOREIGN PATENT DOCUMENTS

| WO | WO 2000/018124 | 3/2000 |
| --- | --- | --- |
| WO | WO 2014/056541 | 4/2014 |
| WO | WO 2014/149802 | 9/2014 |
| WO | WO2016/045236 | 3/2016 |

OTHER PUBLICATIONS

Smith Mark: "What Lies Beneath—Locating and managing the infrastructure that resides underground"; Right of Way; pp. 24-28; XP002757901; Gefunden im Internet: URL:https://www.irwaonline.org/eweb/upload/web_julyaug_14_WhatLiesBeneath.pdf; 2014.

Unmanned Aircraft Sensors and the Importance of "Ground-Truthing"; Geospatial Corporation; XP002757902; Gefunden im Internet: URL:https://www.geounderground.com/article/unmanned-aircraft-ground-truth; 2014.

PCT International Search Report based on PCT/EP2017/057499 dated May 10, 2017.

EP Search Report based on EP Application No. 16164385.3 dated Jul. 1, 2016.

* cited by examiner

LAYER THICKNESS MEASUREMENT OF SOIL COVERING

CROSS-REFERENCE TO RELATED APPLICATIONS

This is a U.S. national stage of application No. PCT/EP2017/057499 filed Mar. 30, 2017. Priority is claimed on EP Application No. 16164385 filed Apr. 8, 2016, the content of which is incorporated herein by reference in its entirety.

BACKGROUND OF THE INVENTION

1. Field of the Invention

The invention relates to a method for layer thickness measurement of soil coverings, in particular in the case of gas and oil pipelines laid underground.

2. Description of the Related Art

By law, gas and oil pipelines laid underground must be covered by a minimum layer thickness of soil. In this case, the pipeline operator is responsible for checking compliance with these layer thicknesses at periodic intervals and for determining changes in the covering. In such cases, a measuring accuracy of approximately 10 cm is typically expected.

At present it is usual to inspect the pipeline run by helicopter from the air and, if anything suspicious is found optically/visually, to validate it by a manual measurement of the layer thicknesses on the ground.

However, this does not represent a continuous measurement over time with a high frequency of overflights, since the relatively expensive overflights using helicopters usually occur only every 24 weeks, or even only quarterly.

In addition, the soil of the soil covering may be continuously eroded, so that the prescribed layer thicknesses are not achieved, even though no significant optical changes occur. Hence, the layer thickness must also be checked at regular intervals by on-site inspections and manual measurements.

SUMMARY OF THE INVENTION

In view of the foregoing, it is an object of the invention to provide a method by which the monitoring of the layer thickness can be simplified.

This and other objects and advantages are achieved in accordance with the invention by a method for layer thickness measurement of soil coverings, particularly in the case of gas and oil pipelines laid underground, wherein the device to be covered is measured and its coordinates are recorded, the terrain profile over the device is measured and a terrain model is determined therefrom and recorded in the specified coordinate system after the soil covering has been applied, and where the thickness of the soil covering is determined from the coordinates of the device and from the terrain model.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail on the basis of the figures, in which.

DETAILED DESCRIPTION OF THE EXEMPLARY EMBODIMENTS

Figure 1:
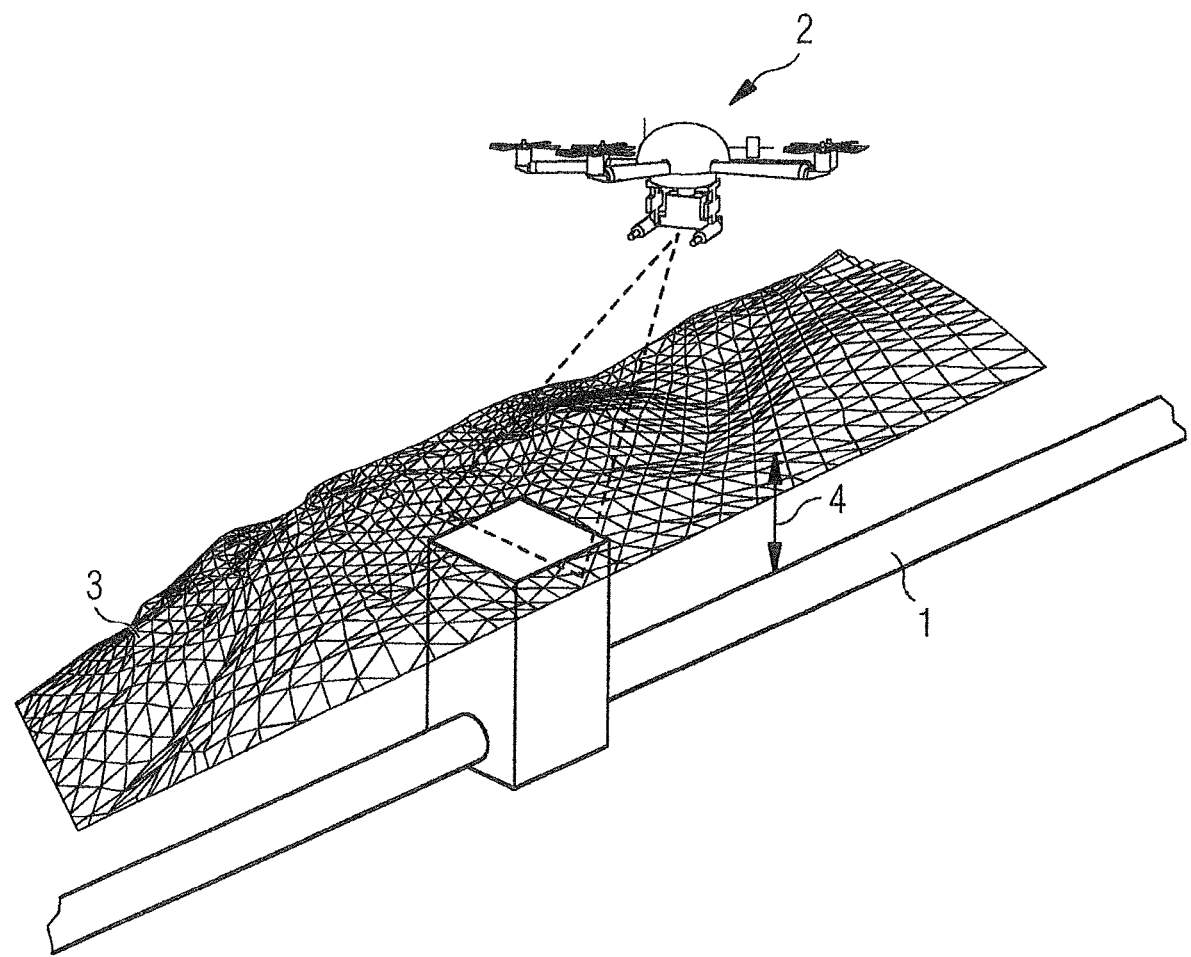
FIG. 1 is an exemplary illustration of the use of an unmanned flying object in accordance with the invention.

The illustration according to FIG. 1 comprises a pipeline 1 laid in the soil and covered with earth, where the layer thickness 4 of the soil covering must have prescribed minimum values.

The position and course of the pipeline 1 is preferably determined precisely and stored during the laying process. In this case, the upper edge of the pipe is of primary importance. That is, it is generally measured with land registry accuracy, i.e., with tolerated deviations in the low single-digit centimeter range. It is possible to (linearly) interpolate between the individual measurement points, in order thus to arrive at a continuous pipeline run ("pipeline polyline"). If necessary, this survey can be performed using unmanned flying objects with suitable measurement systems.

However, it is also conceivable for the position or course of the pipeline 1 to be determined subsequently in the buried state using suitable measurement methods.

This can be achieved, for example, using "measuring probes" with inertial measurement systems that are introduced into the pipe. Another possibility is surveying via radar technology.

Using unmanned flying objects, a digital terrain model 3 is then created, i.e., a digital, numeric storage of the height information of the landscape above and around the pipeline 1.

This can be achieved, for example, via photogrammetry, in which the terrain in question is photographed from different positions during the overflight using surveying cameras. A digital terrain model 3 is then created from the overlapping pictures from the surveying cameras, and together with the data on the pipeline run is used to determine the layer thickness of the soil covering 4.

Besides cameras that work in different spectral ranges, the unmanned flying objects can also, for example, have radar or laser measurement systems.

In addition, a precise position determination of the unmanned flying object is necessary during the overflight and the photographic recordings or measurement processes.

Global satellite navigation systems are particularly suitable for this, the accuracy of which can be improved by stationary receiving stations that transmit correction signals to the users.

As an alternative to satellite navigation systems, position determination using magnetometers, gyrosensors and barometric sensors is also conceivable.

During the overflight by an unmanned flying object 2, it is expedient to take the known run of the pipeline into account in the flight control, i.e., to derive waypoints of the flight automatically from the pipeline polyline. Thus, the flying object 2 can approximately maintain a constant height above the pipeline and thereby implicitly react to height changes in the terrain topography.

Whereas the usual accuracy of a GPS system is sufficient for the flight control as such, a precise position determination is necessary to create the digital terrain model 3 from the photographs of the unmanned flying object 2, as can be effected, for example, using Real Time Kinematic (RTK) or a Differential Global Positioning System (DGPS). This position determination need not be present for every photograph. That is, it is sufficient if the absolute position of the terrain model and its absolute dimensions can be established using individual precise positions.

A special embodiment of the differential GPS is used as real time kinematic, which uses not the GPS messages but the carrier frequency of the signal for synchronization. However, because the carrier frequency is significantly higher than the message frequency, the accuracies achievable with real time kinematic are also significantly higher than with conventional differential GPS methods and are in the range of a few centimeters.

The creation of a 3D model of the terrain can be effected via photogrammetric methods and the use of surveying cameras, i.e., cameras with few imaging errors.

Alternatively, however, methods such as laser altimetry (airborne laser scanning) can be used.

Laser scanning (also called LiDAR=Light Detection And Ranging) is a method of remote sensing in which a laser beam is used to scan the earth's surface and to detect the distance between the detected point on the earth's surface and the sensor.

If the scanning unit is located on a flying object 2, this is known as airborne laser scanning.

The advantages of laser scanning principally lie in the high measurement point density and measurement accuracy that can be achieved, and in the possibility of penetrating vegetation.

The method thus forms an excellent basis for the creation of a digital terrain model which, unlike a digital surface model, represents the earth's surface without buildings or plant cover.

As active systems, laser scanners are not reliant on sunlight, but can also be used to record data at night.

Airborne laser scanners for landscape shots typically work with wavelengths between 800 and 1550 nanometers (infrared), whose spectral width is 0.1 to 0.5 nanometers.

It may be expedient to adjust the wavelength of the laser used to the area of deployment, because the way in which an object reflects or absorbs the laser beams is dependent on the wavelength. Thus, for example, water surfaces absorb light in the visible range very strongly, so that the use of a laser with a wavelength in the visible range impedes the evaluation.

In the case of determining the actual layer thickness, the distance from the top edge of the pipeline 1 to the point of the terrain model 3 respectively lying vertically above it is determined, i.e., the height of points on the pipeline polyline is compared with the height for the geographical width and length corresponding to the respective points on the terrain model 3.

When the pipeline 1 is on a slope, it may also be expedient to determine not only the distance between the top edge of the pipe and the point of the terrain model 3 lying perpendicularly above it, but the shortest distance between a point on the circumference of the pipeline 1 and the intersection of the terrain model 3 with an intersection plane arranged preferably vertically to the axis of the pipe. Thus, lateral undershoots of the prescribed layer thickness can also be determined.

In the exemplary embodiment, an unmanned flying object 2 is used to survey the terrain, which is particularly expedient with respect to the availability and efficiency of deployment. In principal the invention is not, however, restricted to this but can be used with any manned and unmanned vehicles, providing these are able to accommodate the measurement devices.

Over and above this, the use of stationary measurement devices would also be conceivable.

It is advantageous if the inventive method is aligned with the monitoring and control system of the pipeline (SCADA). Thus, for example, an error message from the control system can trigger use for layer thickness measurement in a particular region of the pipeline and the results of the measurements can be represented visually by the monitoring and control system.

The invention can be used not only advantageously for layer thickness measurement of soil coverings in the case of gas and oil pipelines laid underground but, for example, also in the case of water, power and other lines or devices.

Figure 2:
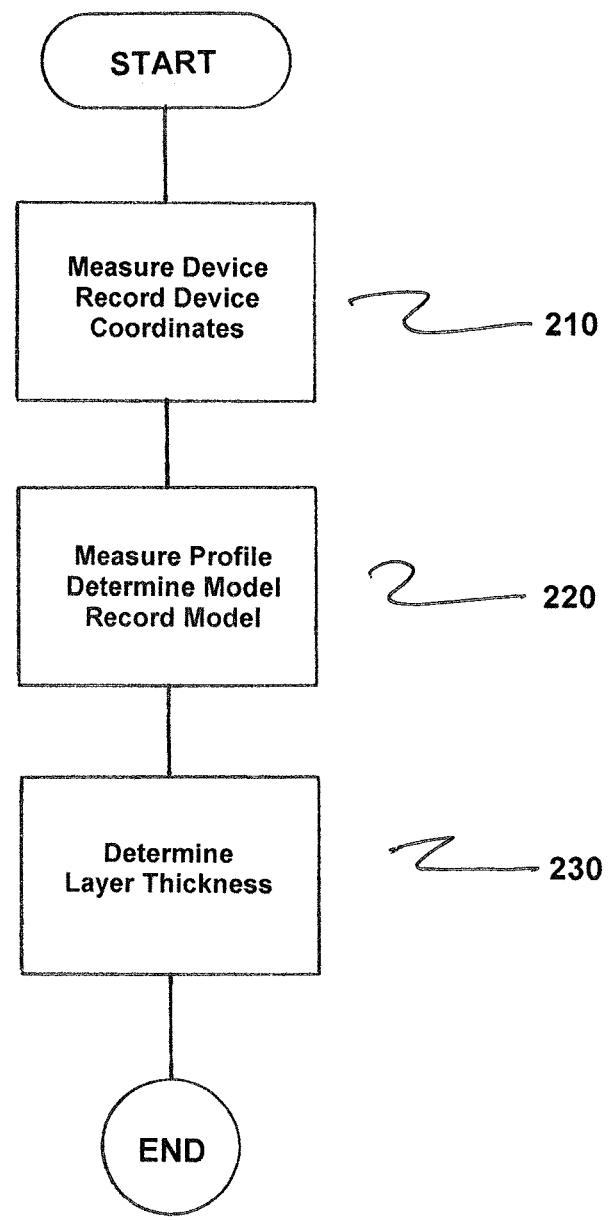
FIG. 2 is a flowchart of the method in accordance with the invention.

FIG. 2 is a flowchart of the method for performing layer thickness measurements of soil coverings over gas and oil pipelines laid underground. The method comprises measuring a device to be covered and recording coordinates of the device, as indicated in step 210.

Next, a terrain profile over the device is measure, a terrain model 3 is determined from the terrain profile, and the determined terrain model 3 is recorded in a specified coordinate system after the soil covering has been applied, as indicated in step 220.

Next, the layer thickness of the soil covering is determined from the recorded coordinates of the device and from the terrain model 3, as indicated in step 230.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for performing layer thickness measurements of soil coverings over gas and oil pipelines laid underground, the method comprising:
   measuring a device to be covered and recording coordinates of the device during laying of the device in the soil;
   measuring a terrain profile over the device, determining a terrain model from the terrain profile, and recording said terrain model in a specified coordinate system after the soil covering has been applied; and determining the layer thickness of the soil covering from the recorded coordinates of the device and from the terrain model.

2. The method as claimed in claim 1, wherein the measurement of the terrain profile over the device is performed via flying objects.

3. The method as claimed in claim 2, wherein the terrain profile is photographed via the flying objects to measure the terrain;
wherein the position of the flying objects is determined via satellite-aided positioning systems; and
wherein a digital terrain model is generated from overlapping photographs and a respectively associated position of the flying object.

4. The method as claimed in claim 2, wherein a surface of the terrain is scanned with a laser beam via the flying objects and a distance between a detected point on the surface of the terrain and each of the flying objects is detected to measure the terrain profile;
wherein each position of the flying objects is determined via satellite-aided positioning systems and a digital terrain model is generated from the distance between the detected point on the surface of the terrain and each of the flying objects and a respectively associated position of the flying objects.

5. The method as claimed in claim 4, wherein the flying object comprises an unmanned flying object.

6. The method as claimed in claim 5, wherein data from a monitoring and control system of the device is used to control the unmanned flying object.

7. The method as claimed in claim 1, wherein a result of the determination of the layer thickness of the soil covering is represented utilizing a monitoring and control system of the device.

* * * * *